US012570577B2

(12) United States Patent
Srubar, III et al.

(10) Patent No.: US 12,570,577 B2
(45) Date of Patent: Mar. 10, 2026

(54) METHODS AND COMPOSITIONS FOR INHIBITING FREEZE-THAW DAMAGE IN CONCRETE AND CEMENT PASTE

(71) Applicant: The Regents of the University of Colorado, a body corporate, Denver, CO (US)

(72) Inventors: Wilfred V. Srubar, III, Boulder, CO (US); Shane Frazier, Broomfield, CO (US); Elizabeth A. Delesky, Boulder, CO (US); Jaqueline D. Wallat-Pullara, Centennial, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 1034 days.

(21) Appl. No.: 17/619,992

(22) PCT Filed: Jun. 17, 2020

(86) PCT No.: PCT/US2020/038198

§ 371 (c)(1),
(2) Date: Dec. 16, 2021

(87) PCT Pub. No.: WO2020/257322

PCT Pub. Date: Dec. 24, 2020

(65) Prior Publication Data

US 2022/0298075 A1 Sep. 22, 2022

Related U.S. Application Data

(60) Provisional application No. 63/017,933, filed on Apr. 30, 2020, provisional application No. 62/923,299,
(Continued)

(51) Int. Cl.
*C04B 24/26* (2006.01)
*C04B 28/02* (2006.01)
(Continued)

(52) U.S. Cl.
CPC .......... *C04B 24/2629* (2013.01); *C04B 28/02* (2013.01); *C04B 40/0046* (2013.01);
(Continued)

(58) Field of Classification Search
CPC . C04B 24/2629; C04B 28/02; C04B 40/0046; C04B 2103/0053;
(Continued)

(56) References Cited

U.S. PATENT DOCUMENTS 3,663,251 A * 5/1972 Moren .................... C04B 28/04
106/725
4,049,465 A * 9/1977 Dwyer .................... C04B 28/02
106/645
(Continued)

FOREIGN PATENT DOCUMENTS

EP 604676 A1 * 7/1994 ......... C04B 24/2623
WO WO-0016619 A1 * 3/2000 ............. A01N 1/125
WO WO-2020007913 A1 * 1/2020

*Primary Examiner* — Doris L Lee
(74) *Attorney, Agent, or Firm* — Snell & Wilmer L.L.P.

(57) ABSTRACT

Cement paste compositions, concrete compositions, and methods of forming the cement paste compositions and concrete compositions are disclosed. Exemplary cement paste compositions and concrete compositions include a water-soluble additive that is dissolved and is configured to perform one or more of ice recrystallization inhibition and dynamic ice shaping when the cement composition is exposed to temperatures less than or equal to a freezing temperature of water.

18 Claims, 9 Drawing Sheets

Related U.S. Application Data filed on Oct. 18, 2019, provisional application No. 62/862,556, filed on Jun. 17, 2019.

(51) Int. Cl.
*C04B 40/00* (2006.01)
*C04B 103/00* (2006.01)
*C04B 103/60* (2006.01)
*C04B 111/20* (2006.01)

(52) U.S. Cl.
CPC .......................... *C04B 2103/0053* (2013.01); *C04B 2103/601* (2013.01); *C04B 2111/29* (2013.01)

(58) Field of Classification Search
CPC ........... C04B 2103/601; C04B 2111/29; C04B 2111/76; C04B 28/04; C04B 24/04; C04B 24/10; C04B 24/128; C04B 24/14; C04B 24/2623; C04B 24/2641; C04B 24/2652; C04B 24/32; C04B 14/06; C04B 16/06; C04B 18/08; C04B 18/141; C04B 20/008
See application file for complete search history.

(56) References Cited

U.S. PATENT DOCUMENTS 6,391,224 B1 * 5/2002 Wowk .................... C09K 3/185
47/2
2004/0226482 A1 * 11/2004 Johansen, Jr. .......... C04B 28/02
106/712

* cited by examiner

METHODS AND COMPOSITIONS FOR INHIBITING FREEZE-THAW DAMAGE IN CONCRETE AND CEMENT PASTE

CROSS-REFERENCE TO RELATED APPLICATIONS

This application is a U.S. national stage entry under 35 U.S.C. § 371 of International Application No. PCT/US2020/038198 entitled "METHODS AND COMPOSITIONS FOR INHIBITING FREEZE-THAW DAMAGE IN CONCRETE AND CEMENT PASTE," filed Jun. 17, 2020, which claims the benefit of U.S. Provisional Application No. 62/862,556, filed Jun. 17, 2019, U.S. Provisional Application No. 62/923,299, filed Oct. 18, 2019, and U.S. Provisional Application No. 63/017,933, filed Apr. 30, 2020, the contents of which are hereby incorporated herein by reference to the extent such contents do not conflict with the present disclosure.

STATEMENT REGARDING FEDERALLY-SPONSORED RESEARCH OR DEVELOPMENT

This invention was made with government support under Award No. CMMI1727788 awarded by the National Science Foundation and Grant Number NCHRP-204 awarded by the National Academy of Sciences—National Cooperative Highway Research Program. The government has certain rights in the invention.

FIELD OF THE DISCLOSURE

The disclosure generally relates to cement paste and concrete compositions and to methods of forming the compositions. More particularly, the disclosure relates to cement paste and concrete compositions that include an additive to mitigate freeze-thaw damage in concrete and to methods of forming the compositions.

BACKGROUND OF THE DISCLOSURE

Concrete, generally a mixture of water, aggregates, and ordinary Portland cement (OPC), is one of the most consumed materials on Earth, and the economic and environmental consequences of its ubiquity are significant. The production of OPC alone accounts for an estimated 4 to 8.6% of global $CO_2$ emissions, and its use places a burdensome toll on potable water resources, especially in water-scarce communities. As the global population continues to rise, cement production is estimated to increase by about 50% by 2050 to keep pace with new and aging infrastructure demands in both developing and developed countries. In all parts of the world, the long-term resilience of cementitious materials remains important to reducing or minimizing economic and environmental costs associated with unplanned damage and maintenance, especially in light of a changing climate that may exacerbate exposure conditions and lead to premature deterioration.

Cementitious materials exposed to cyclic freezing and thawing are highly susceptible to damage. It is well known that the formation and growth of ice crystals within the pores of cementitious materials can create hydraulic, osmotic, and crystallization pressures high enough to induce microscale cracks. Cracking accelerates deterioration by reducing bulk mechanical integrity, exacerbating water and ion penetration, and increasing susceptibility to damage upon exposure to subsequent freeze-thaw cycles.

The prevailing strategy to enhance the freeze-thaw resistance of OPC concrete is to entrain an air void system in a cement paste using surfactant-based air-entraining admixtures (AEAs) to reduce the pressure that otherwise develops during cyclic freezing and thawing of water in capillary pores of concrete. Conventional AEAs create stabilized air void systems within cementitious matrices via surfactant mechanisms. AEAs must produce air voids of specific size distributions with proper spacing. AEAs entrain about 16-25% by volume of cement paste or about 4-10% by volume of concrete. Despite enhancing freeze-thaw resistance, the introduction of an air void system results in reduced mechanical strength, which can be as high as 5% per 1% entrained air and an increase in permeability that is proportional to the amount of introduced air.

Researchers have utilized a variety of other materials and methods—often in tandem with AEAs—to enhance the freeze-thaw resistance of cementitious materials. These strategies include (1) densifying and strengthening cement paste using nanoparticles or supplementary cementitious materials, (2) incorporating superabsorbent hydrogel particles as a non-surfactant method to achieve an entrained air void system, and (3) using macroscale polymeric fibers for mitigating crack propagation due to frost-induced damage.

Despite some success, all of these methods aim at mitigating deleterious symptoms of ice expansion in cement paste and concrete rather than inhibiting the source—ice crystal growth. Accordingly, improved methods and compositions for mitigating freeze-thaw damage in cement paste and concrete are desired.

Any discussion of problems and solutions involved in the related art has been included in this disclosure solely for the purposes of providing a context for the present invention and should not be taken as an admission that any or all of the discussion was known at the time the invention was made.

SUMMARY OF THE DISCLOSURE

Various embodiments of the present disclosure relate to cement paste compositions and concrete compositions and to methods of forming such compositions. While the ways in which various embodiments of the present disclosure address drawbacks of prior techniques are discussed in more detail below, in general, various embodiments of the disclosure provide improved compositions suitable for reducing an amount of freeze-thaw damage that can otherwise occur in cement pastes and concrete.

In accordance with various examples of the disclosure, a cement paste composition includes cement, water, and a water-soluble additive. In accordance with various aspects of these embodiments, the water-soluble additive in the cement composition is in dissolved form. In accordance with further aspects, the water-soluble additive is configured to perform one or more of ice recrystallization inhibition and dynamic ice shaping when the cement composition is exposed to temperatures less than or equal to a freezing temperature of water. In accordance with examples of these embodiments, a weight ratio of the water-soluble additive to the cement in the cement paste composition can range from greater than zero and less than 1%, greater than zero and less than 0.5%, about 0.01% to about 1.0%, about 0.02% to about 0.25%, or about 0.03% to about 0.07%. In accordance with further examples of the disclosure, the water-soluble additive is or includes one or more polymers. In some cases, the water-soluble additive can include one or more copolymers.

In the case in which the water-soluble additive comprises a copolymer, the copolymer can include a first segment configured to perform the one or more of ice recrystallization inhibition and dynamic ice shaping and a second segment. The second segment can be relatively more stable in the cement paste—e.g., at a pH greater than or equal to 7, or about 7 to about 14 or about 12 to about 13.5. By way of particular examples, a copolymer can include one or more of polyvinyl alcohol (PVA) and polyethylene glycol (PEG). In accordance with further examples of the disclosure, the water-soluble additive can include one or more of safranin-O, folic acid, gelatin, and alkylated galactose derivatives.

In accordance with further examples of the disclosure, a concrete composition is provided. The concrete composition can include a cement paste as described herein and additional components. For example, the concrete composition can additionally include coarse aggregate, fine aggregate, and one or more other solid compounds, such as fly ash, slag, other natural or synthetic pozzolans, fibers, and/or one or more liquid admixtures.

In accordance with yet additional examples of the disclosure, a method of forming concrete includes mixing an additive in water to form a solution; and adding cement and aggregate to the mixture. The additive can be dissolved in the water. In accordance with various aspects of these embodiments, the additive is configured to perform one or more of ice recrystallization inhibition and dynamic ice shaping when the concrete is exposed to temperatures less than or equal to a freezing temperature of water. Exemplary methods can include adding one or more other solid or liquid additives.

These and other embodiments will become readily apparent to those skilled in the art from the following detailed description of certain embodiments having reference to the attached figures; the invention not being limited to any particular embodiment(s) disclosed.

BRIEF DESCRIPTION OF THE DRAWING FIGURES

A more complete understanding of exemplary embodiments of the present disclosure can be derived by referring to the detailed description and claims when considered in connection with the following illustrative figures.

Figure 1:
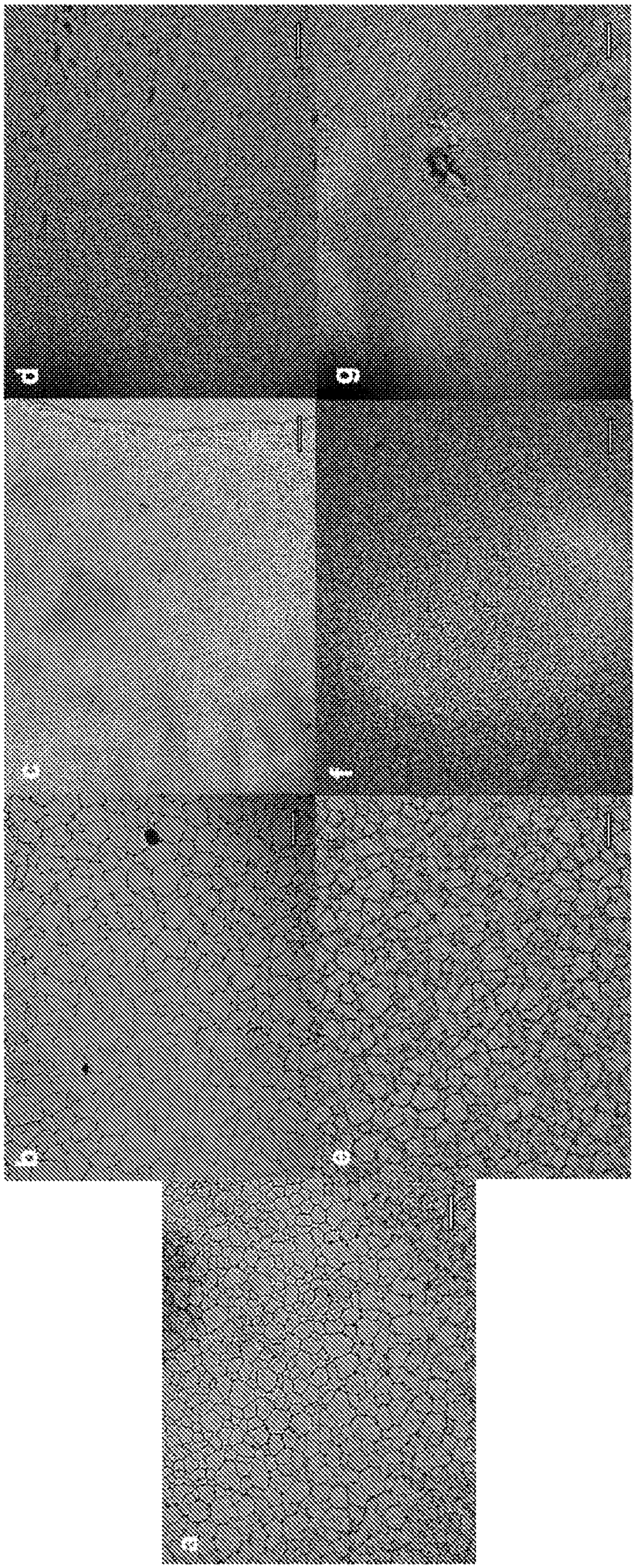
FIG. 1 illustrates optical micrographs of IRI splat assay in accordance with examples of the disclosure.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS

Although certain embodiments and examples are disclosed below, it will be understood by those in the art that the invention extends beyond the specifically disclosed embodiments and/or uses of the invention and obvious modifications and equivalents thereof. Thus, it is intended that the scope of the invention disclosed should not be limited by the particular disclosed embodiments described below.

The present disclosure generally relates to cement paste compositions, concrete compositions, and to methods of forming cement paste compositions and concrete compositions. As set forth in more detail below, cement paste compositions and concrete compositions in accordance with examples of the disclosure exhibit one or more of ice recrystallization inhibition (IRI) and dynamic ice shaping (DIS) activities, such that concrete formed with such compositions can exhibit less freeze-thaw damage than would otherwise occur in cement formed using traditional compositions.

Antifreeze proteins (AFPs) and antifreeze glycoproteins (AFGPs) are a subset of ice-binding proteins (IBPs) produced by plants, fish, insects, and bacteria that enable a variety of organisms to survive freezing temperatures. By binding to the surface of ice, AFPs and AFGPs can inhibit the growth and coalescence of ice crystals (i.e., Ostwald ripening) via a process called ice recrystallization inhibition (IRI). AFPs and AFGPs also induce dynamic ice shaping (DIS) and reduce the freezing point of ice below the equilibrium freezing point (i.e., thermal hysteresis). Recent work suggests that ice-binding and antifreeze properties are a result of anchored clathrate and ice-like motifs in AFPs.

Researchers have successfully isolated AFPs and AFGPs from a multitude of freeze-tolerant organisms. However, proteins are well known to restructure in non-native environments, yielding high alkalinity (pH>12.5) of concrete pore solution unfavorable for protein stability. Other studies have shown that some proteinaceous materials behave like set-retarding admixtures in fresh concrete, further limiting their applicability.

The present disclosure provides cement paste compositions and concrete compositions that include a water-soluble additive that is dissolved in water and is configured to perform one or more of ice recrystallization inhibition and dynamic ice shaping when the cement composition is exposed to temperatures less than or equal to a freezing temperature of water. The water-soluble additive can mimic the IRI and DIS activity of native ice-binding proteins—even in high-pH media characteristic of concrete pore solutions. Exemplary cement paste compositions and concrete compositions can exhibit both IRI and DIS in neutral and high-pH solutions and/or can inhibits cyclic freeze-thaw damage while entraining <1% air in paste and <5% or 3% or <1% air in concrete by volume. Further, compositions in accordance with examples of the disclosure exhibited no significant effect on the heat of hydration, time of set, flowability, and mineralogy of cement paste.

In accordance with exemplary embodiments of the disclosure, a cement paste composition includes cement, water, and a water-soluble additive. The water-soluble additive in the cement composition can be dissolved and be configured to perform one or more of ice recrystallization inhibition and dynamic ice shaping when the cement composition is exposed to temperatures less than or equal to a freezing temperature of water. Further, the water-soluble additive may exhibit relatively low cryogelation potential (e.g., lower than PVA alone in cement paste).

The cement can include any suitable cement, such as cement used in the formation of concrete. By way of examples, the cement can be or include ordinary Portland cement (OPC), slag cements, or the like. An amount of cement in the cement paste can range from about 20 to about 90 or about 30 to about 80 weight percent.

The water-soluble additive can comprise a polymer or other molecule that exhibits various properties described herein, such as freeze-thaw damage inhibition in cement paste including the water-soluble additive and/or inhibition ice crystal growth in a cement paste comprising the cement composition. In accordance with examples of the disclosure, the water-soluble additive comprises a polymer. In some cases, the polymer comprises a copolymer.

Exemplary polymers suitable for the water-soluble additive can include an —OH functional group and can have a molecular weight ranging from about 500 and about 500,000, about 10,000 and about 150,000, or about 40,000 and about 50,000 Daltons. In accordance with illustrative examples of the disclosure, the water-soluble additive comprises a polymer or polymer segment that comprises one or more of polyvinyl alcohol (PVA), poly(2-hydroxyethyl methacrylate) (pHEMA), poly(2-hydroxypropyl methacrylamide) (pHPMA), polyethylene glycol (PEG), and zirconium acetate. By way of particular examples, the water-soluble additive can comprise a polymer or polymer segment that comprises one or more of polyvinyl alcohol (PVA) and polyethylene glycol (PEG).

Exemplary copolymers suitable for the copolymer can include a first segment configured to perform the one or more of ice recrystallization inhibition and dynamic ice shaping and a second segment. The second segment may be more stable in the cement paste, relative to the first segment (e.g., at a pH greater than or equal to 7, or about 7 to about 14 or about 12 to about 13.5) and/or may facilitate dissolution of the water-soluble additive at lower (e.g., at or near ambient temperature (e.g., 25° C.)) and/or within the pH ranges noted above, compared to polymers that include only the first segment. A molecular weight of the copolymer can be as noted above in connection with polymers.

Figure 8:
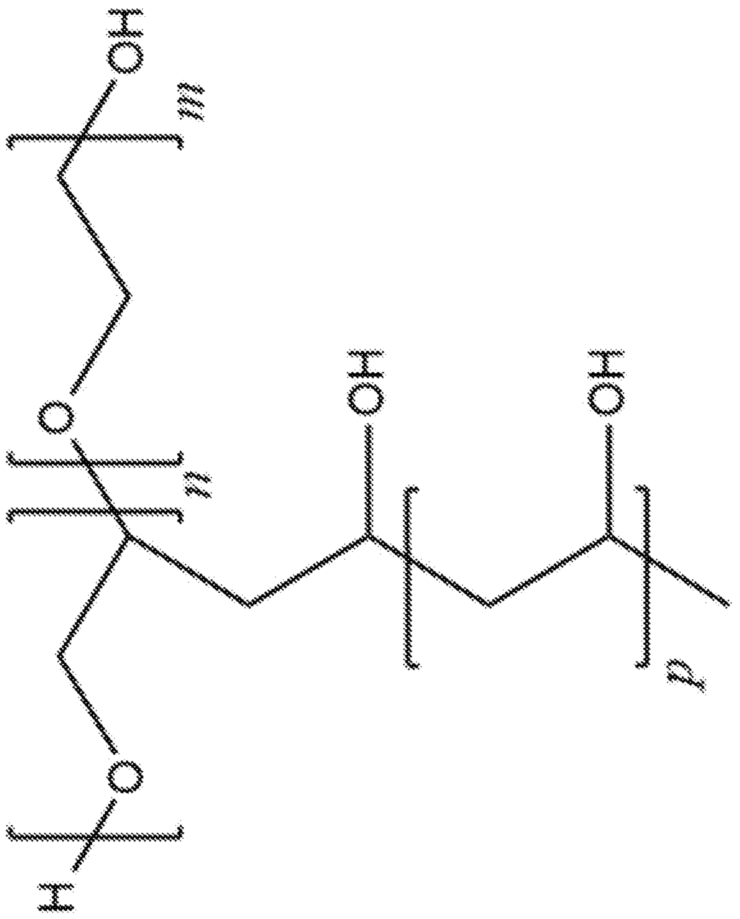
FIG. 8 illustrates a copolymer, polyethylene glycol-polyvinyl alcohol (PEG-PVA), in accordance with particular examples of the disclosure.

FIG. 8 illustrates a copolymer, polyethylene glycol-polyvinyl alcohol (PEG-PVA), in accordance with particular examples of the disclosure. The PEG-PVA copolymer can be represented by the general formula $(C_2H_3O)_n(C_2H_4O)_m(C_2H_4O)_p$. The n:m ratio can range from about 0:19 to about 0:2303, about 6:19 to about 561:1685, or about 229:687 to about 286:858, and/or n can range from about 0 or greater than 0 to about 561, about 6 to about 561, or about 229 to about 561, m can range from about 0 to about 2303, about 19 to about 1695, or about 687 to about 858, and/or p can range from about 0 to about 2303, about 19 to about 1695, or about 687 to about 858.

Other compounds suitable for use as the water-soluble additive include one or more of safranin-O, folic acid, gelatin, and alkylated galactose derivatives.

A weight ratio of the water-soluble additive to the cement in the cement past can be, for example, between greater than zero and less than 2%, greater than zero and less than 1%, greater than zero and less than 0.5%, about 0.01% to about 1.0%, about 0.02% to about 0.25%, or about 0.03% to about 0.07%.

In accordance with further examples of the disclosure, a concrete composition (a composition for use in the formation of concrete) can include or be formed using a cement paste composition as described herein. The cement composition can additionally include coarse aggregate and fine aggregate.

The coarse aggregate can include, for example, crushed stone, river gravel, or the like. A cross-sectional dimension of the coarse aggregate can be greater than 4.5 mm or range from about 4 to about 130 or about 5 to about 50 mm. The concrete composition can include about 15 to about 60, about 25 to about 50, or about 30 to about 45 wt % of the coarse aggregate.

The fine aggregate can include, for example, sand, manufactured fine aggregate, or the like. A cross-sectional dimension of the fine aggregate can be less than 4.5 mm or range from about 0.002 to about 4.5 or about 0.2 to about 4.5 mm. The concrete composition can include about 15 to about 50, about 25 to about 45, or about 25 to about 40 wt % of the fine aggregate.

The cement can include a cement as described above. In accordance with examples of the disclosure, the concrete composition can include about 1 to about 30, about 3 to about 20, or about 5 to about 10 wt % of the cement.

Concrete compositions described herein can be used to form concrete that exhibits freeze-thaw damage inhibition and/or inhibition to ice crystal growth and/or dynamic ice shaping, compared to concrete formed with traditional compositions. In accordance with further examples, concrete formed in accordance with examples of the disclosure—e.g., concrete formed from a concrete composition comprising a water-soluble additive, were found to exhibit an increased air content and slump compared to unmodified concrete.

Exemplary concrete compositions can include one or more additional compounds, such as one or more compounds selected from the group consisting of fly ash, slag, other natural or synthetic pozzolans, and fibers. Additionally or alternatively, exemplary concrete compositions can include one or more liquid admixtures, such as water reducers, set-accelerators, set-retarders, or other viscosity-modifying admixtures.

Figure 9:
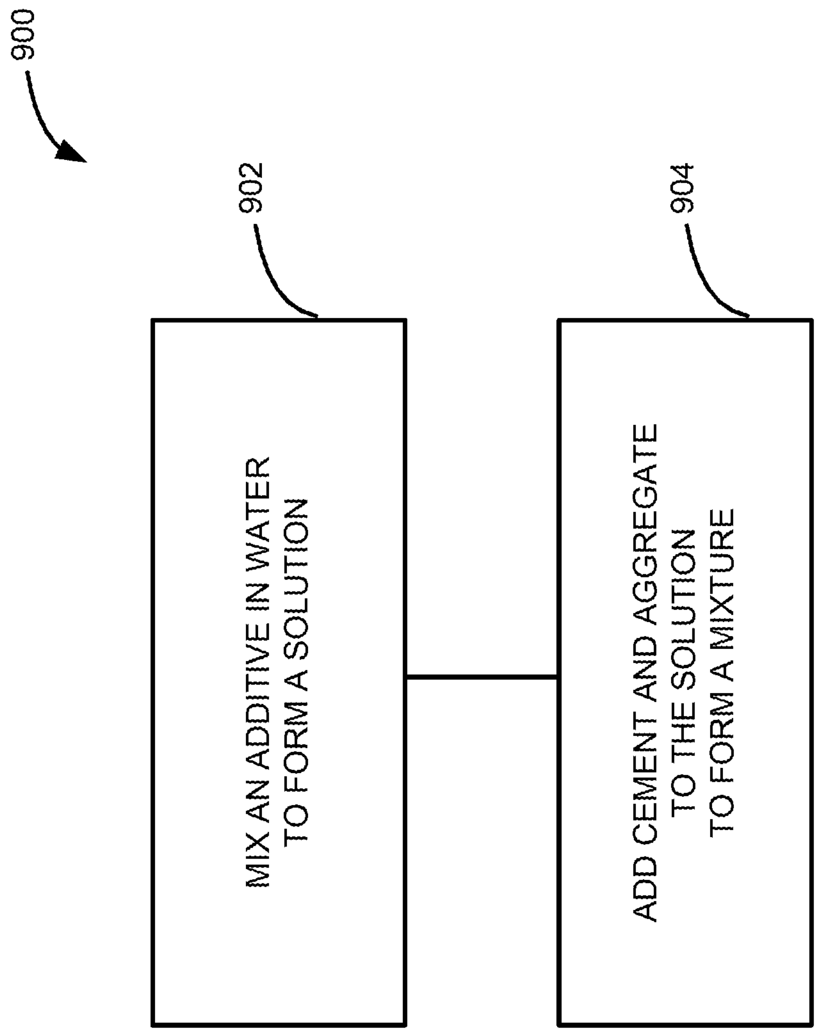
FIG. 9 illustrates a method in accordance with examples of the disclosure.

Turning now to FIG. 9, a method of forming concrete 900 is illustrated. Method 900 includes mixing an additive in water to form a solution (step 902) and adding cement and aggregate to the mixture (step 904). A method of forming a cement paste can include similar steps, except for adding aggregate to the solution. In other words, a method of forming a cement paste can include mixing an additive in water to form a solution and adding cement to the solution to form the cement paste.

During step 902, one or more additives, such as one or more water-soluble additives as described herein, is dissolved in water. The additive can be configured to perform one or more of ice recrystallization inhibition and dynamic ice shaping when the concrete is exposed to temperatures less than or equal to a freezing temperature of water. Unlike other methods of forming concrete compositions that may include additional long-chain polymers in fibrous form to a dry composition, method 900 includes step 902 of mixing (e.g., dissolving) an additive in water to form a solution.

This enables formation of cement paste and concrete compositions with desirable properties, such as those noted herein.

In accordance with examples of the disclosure, the water-soluble additive can be dissolved at ambient temperature—i.e., without added heat. For example, the water-soluble additive can dissolve in water at temperatures less than 100° C., less than 50° C., or less than 30° C. In accordance with further examples, the water-soluble additive can dissolve in water at pH greater than 2 or 3, or between about 2 and 13 or about 5 and 9.

During step 904, cement and aggregate are added to the solution. The cement can include cement as described above. The aggregate can include coarse and/or fine aggregate as described above.

Exemplary methods can additionally include one or more other solid or liquid additives. The solid additives can include, for example, one or more of fly ash, slag, other natural or synthetic pozzolans, and fibers. The liquid additives can include, for example, one or more liquid admixtures as described herein. The steps of adding cement and aggregate to the mixture and adding one or more other solid or liquid additives can overlap in time.

The specific examples provided below are meant to illustrate exemplary aspects of the disclosure. The examples provided below are not meant to limit the scope of the invention as set forth in the claims.

SPECIFIC EXAMPLES

The examples below illustrate effects of PEG, PVA, and PEG-PVA added to compositions used to form cement paste and concrete. Again, unless otherwise noted, the disclosure is not limited to such examples.

Materials

PEG-PVA (CAS #96734-39-3), PEG (CAS #25322-68-3), and PVA (CAS #9002-89-5) were purchased from Sigma-Aldrich and used without any modification. MasterAir AE 200 was obtained from BASF. Research grade $Ca(OH)_2$ was purchased from Fisher Scientific. The cement used was a commercially available Type I/II OPC (Quikrete®) that complies with ASTM C150. Both fine and coarse aggregates were acquired from Martin Marietta (Golden, CO). Coarse aggregate had a nominal maximum size of <25 mm.

Ice Recrystallization Inhibition

A modified ice recrystallization assay was performed to observe ice recrystallization inhibition (IRI) activity of polymers. All samples were analyzed in triplicate. 10 μL of the sample was dropped from 1.7 m onto a glass slide (thickness of 1 mm). The glass slide was pre-cooled on an aluminum block at −78° C. The slide was then immediately transferred to an Otago nanoliter osmometer cold stage and annealed at −4° C. (air temperature) for 30 minutes. Images were collected immediately after the sample was placed on the cold stage ($t_0$), and again at 30 minutes ($t_{30}$) to observe ice recrystallization. Images were obtained using an Olympus BX41 microscope with ELWD U Plan 20×/0.45 objective and crossed polarizers, equipped with an OMAX A35140U camera on a 0.5× C-mount adapter.

The polymers were tested in a neutral buffer and a pH 13 adjusted buffer solution. Polymers were tested in PBS and the pH 13 solution was made with the addition of NaOH. Concentrations of 0.25 mg/mL and 0.50 mg/mL were chosen for PEG, PVA, and PEG-PVA.

Dynamic Ice Shaping

Dynamic ice shaping (DIS) occurs when a material interacts with one or more crystallographic planes of ice resulting in a change to the morphology of a single ice crystal. To observe DIS, a nanoliter-sized drop of the sample was placed in microscopy immersion oil (Sigma) where both are in a hole of ~0.5 mm diameter within an aluminum disk. The aluminum disk was placed on an Otago nanoliter osmometer cold stage, where the temperature of the cold stage was rapidly cooled to −20° C. to form polycrystalline ice. Next, the sample was slowly melted to form a single ice crystal by heating at a rate of approximately 5° C./min. Once a single ice crystal was obtained, the temperature was kept constant for 3 minutes to ensure stability. Lastly, the sample was cooled at 0.01° C./min until crystal growth and/or ice shaping was observed. The polymers were tested in DI water and a saturated $Ca(OH)_2$ solution. A concentration of 10 mg/mL was tested for all polymers.

Cement Paste and Concrete Sample Preparation

All OPC paste samples were hand mixed for 3 minutes with a 0.42 water to cement ratio (w/c) and cured for 14 days in a 99% relative humidity chamber prepared according to ASTM C192 at 20±2° C. Freeze-thaw resistance, air content, and compressive strength samples were cast in cylindrical polyethylene molds 32 mm in height and 16 mm in diameter complying with the ratios of height to diameter provided in ASTM C39. Table 1 provides the sample compositions of cement paste samples. The amounts of PEG, PVA, and PEG-PVA chosen in the mix design were based on the concentrations used for IRI testing (i.e., 0.25 mg/mL=0.010 wt % polymer in mixing water).

TABLE 1

Cement paste mix design formulations.

| Sample | w/c Ratio | Polymer (wt. % of cement) |
|---|---|---|
| Control | 0.42 | — |
| PEG-L | 0.42 | 0.010% |
| PEG-H | 0.42 | 0.021% |
| PVA-L | 0.42 | 0.010% |
| PVA-H | 0.42 | 0.021% |
| PEG-PVA-L | 0.42 | 0.010% |
| PEG-PVA-H | 0.42 | 0.021% |

Concrete specimens were prepared using the mix compositions described in Table 2. All components were weighed using a balance (Adam Equipment CBC 35a) and mixed using a commercially available mixer (YardMax YM0115). PEG-PVA was added to the mixing water and stirred until dissolved. Coarse aggregate was pre-wetted with a small amount of mixing water prior to mixing. After the initiation of mixing, fine aggregate and cement were placed in the mixer along with the rest of the mixing water. Concrete ingredients were mixed for three minutes followed by a three-minute rest, where a trowel was used to hand mix dry and wet components inside the mixer, followed by an additional two minutes of mixing. The same process was repeated until uniform consistency was achieved, in accordance with ASTM C192.

TABLE 2

| Concrete mix design formulations. | | | | | | |
|---|---|---|---|---|---|---|
| Material | Control | 0.022% PEG-PVA | 0.066% PEG-PVA | 0.25% PEG-PVA | 1.0% PEG-PVA | AEA |
| Cement (Type I/II) (kg/m$^3$) | 309 | 309 | 309 | 309 | 309 | 309 |
| Fine aggregate (kg/m$^3$) (Moisture Content 3.3%) | 600 | 600 | 600 | 600 | 600 | 600 |
| Coarse aggregate (kg/m$^3$) (Moisture Content 0.29%) | 1210 | 1210 | 1210 | 1210 | 1210 | 1210 |
| Water/Cement Ratio (%) | 50 | 50 | 50 | 50 | 50 | 50 |
| PEG-PVA/Cement Ratio (%) | 0 | 0.022 | 0.066 | 0.25 | 1.00 | 0 |
| AEA (mL/100 kg of cement) | 0 | 0 | 0 | 0 | 0 | 15 |

Concrete was placed into cylinder molds in three layers and prism molds in two layers. After the addition of each layer, the specimens were vibrated until proper consolidation was achieved. Specimens were stored at ambient conditions in a vibration-free environment and covered to prevent evaporation of water. After 48 hours, specimens were removed from the molds and transferred to a saturated $Ca(OH)_2$ solution for the remainder of the curing process. Water was saturated with calcium hydroxide per ASTM C511 to prevent leaching of calcium hydroxide from specimens. Cylindrical specimens were cured for 28 days per ASTM C 192 and prisms for 14 days per ASTM C666. Each test group consisted of at least three 10.16 cm×20.32 cm cylinders and four 7.62 cm×7.62 cm×40.64 cm specimens.

Freeze-thaw Resistance

Freeze-thaw cycling of OPC paste samples was performed in a custom-built chamber following a modified version of ASTM C666 procedure A. All samples were tested for a total of 30 cycles in which the freezing lasted for 1.5 hours and thawing for 2.5 hours, respectively. During freezing cycles, the temperature reached −15° C.±2° C. and during thawing cycles, 16.5° C.±2° C., as measured with a DHT-22 temperature sensor (SparkFun Electronics, USA). To ensure samples remained saturated, a minimal water level was maintained in the bottom of the chamber.

Freeze-thaw cycling of concrete was performed following ASTM C666 Procedure A. A modified Humboldt (HC-3186S.4F) freeze-thaw cabinet was used. Three prisms from each test group were subjected to 300 cycles, labeled P1-P3. An additional prism was kept at room temperature and labeled P4. The freezing portion of each cycle had a duration of three hours and reached a minimum of −18° C.±2° C. The thawing portion of each cycle had a duration of one hour and reached a maximum of 4° C.±2° C. The water level prescribed in ASTM 0666 Procedure A was maintained throughout testing.

Freeze-thaw resistance was evaluated by measuring the fundamental transverse frequency and length change of prism samples every 36 cycles, including measurements before freeze-thaw cycling. Fundamental transverse frequency was determined using the forced resonance method in accordance to ASTM C215 of prisms P1-P4 of each test group. The fundamental transverse frequency was used to calculate the relative dynamic modulus of elasticity ($P_c$) according to:

$$P_c = \left(\frac{n_1^2}{n^2}\right) \times 100 \quad \text{Eq. 1}$$

where $n_1$ is the fundamental transverse frequency at 0 cycles of freezing and thawing and n is the fundamental transverse frequency after c cycles of freezing and thawing.

The freeze-thaw cycling was continued until one of the following conditions was met: (1) samples undergo 300 freeze-thaw cycles or (2) relative dynamic modulus of elasticity falls below 60%. Length change was recorded as an indicator of deterioration but was not necessarily used as criteria for ending the test. The durability factor, DF, was also calculated for each test group as outlined in ASTM C666 according to:

$$DF = \frac{PN}{M} \quad \text{Eq. 2}$$

where P is the relative dynamic modulus of elasticity at N cycles (%), N is the number of cycles at which P reaches the specified minimum value for discontinuing the test or the specified number of cycles at which the exposure is to be terminated, whichever is less, and M is the specified number of cycles at which the exposure is to be terminated.

Hardened-State Air Content

Micro X-ray computed tomography (MXCT) enabled 3D visualization of internal air void systems. The MXCT (ZEISS Xradia 520 Versa) source voltage was set to 140 kV and the power to 10 W. An objective with an optical magnification of 0.4× was used.

For paste samples, the source and detector locations were varied to obtain a desired resolution (voxel size) of approximately 4.6 μm. Samples were scanned using MXCT before and after freeze-thaw cycling. The scans performed before cycling were used to ensure cracking was not occurring due to other phenomenon (e.g., shrinkage). Internal cracks present in the samples post freeze-thaw cycling indicated damage due to freeze-thaw cycling. Post-freeze-thaw concrete samples, the source and detector locations were varied to obtain a desired resolution (voxel size) of approximately 6 μm. Cubic samples cut from cylindrical specimen having volumes of approximately 17 cm$^3$.

The volume percent of air in OPC paste and concrete samples, or air content, pre-freeze-thaw cycling was determined from the volume of all voids with diameters greater than 50 μm for paste and 15 μm for concrete. These diameters were chosen based on the accepted size range of air voids, previous research, and resolution capabilities of MXCT. Dragonfly 3.9 software (Object Research Systems) was used to generate the reconstructions, to calculate the scanned volume of sample ($V_{sample}$), and volume of all voids.

The MXCT 3D reconstructions were analyzed in Dragonfly 3.9 software to determine the air void distribution (i.e., frequency of voids for a given diameter range). MXCT 2D cross-sections were analyzed to determine the spacing factor and specific surface. The equations provided in the linear traverse method of ASTM C457 were used to calculate spacing factor without modification. This approach has previously been used to calculate the spacing factor.

FIG. 1 illustrates optical micrographs of IRI splat assay of PEG, PVA, and PEG-PVA in PBS. Images show individual ice crystal grains that form in (a) PBS control solution, (b) 0.25 mg/mL PEG (PEG-L), (c) 0.25 mg/mL PVA (PVA-L), (d) 0.25 mg/mL PEG-PVA (PEG-PVA-L), (e) 0.50 mg/mL PEG (PEG-H), (f) 0.50 mg/mL PVA (PVA-H), and (g) 0.50 mg/mL PEG-PVA (PEG-PVA-H) in PBS after 30 minutes of annealing at −4° C. Scale bars=100 μm. As shown, PVA exhibits some IRI activity, while PEG alone displays no IRI activity. PEG-PVA copolymer exhibited IRI activity and reduced an average ice crystal grain size up to 90% when compared to a phosphate buffer solution (PBS) control.

Figure 2:
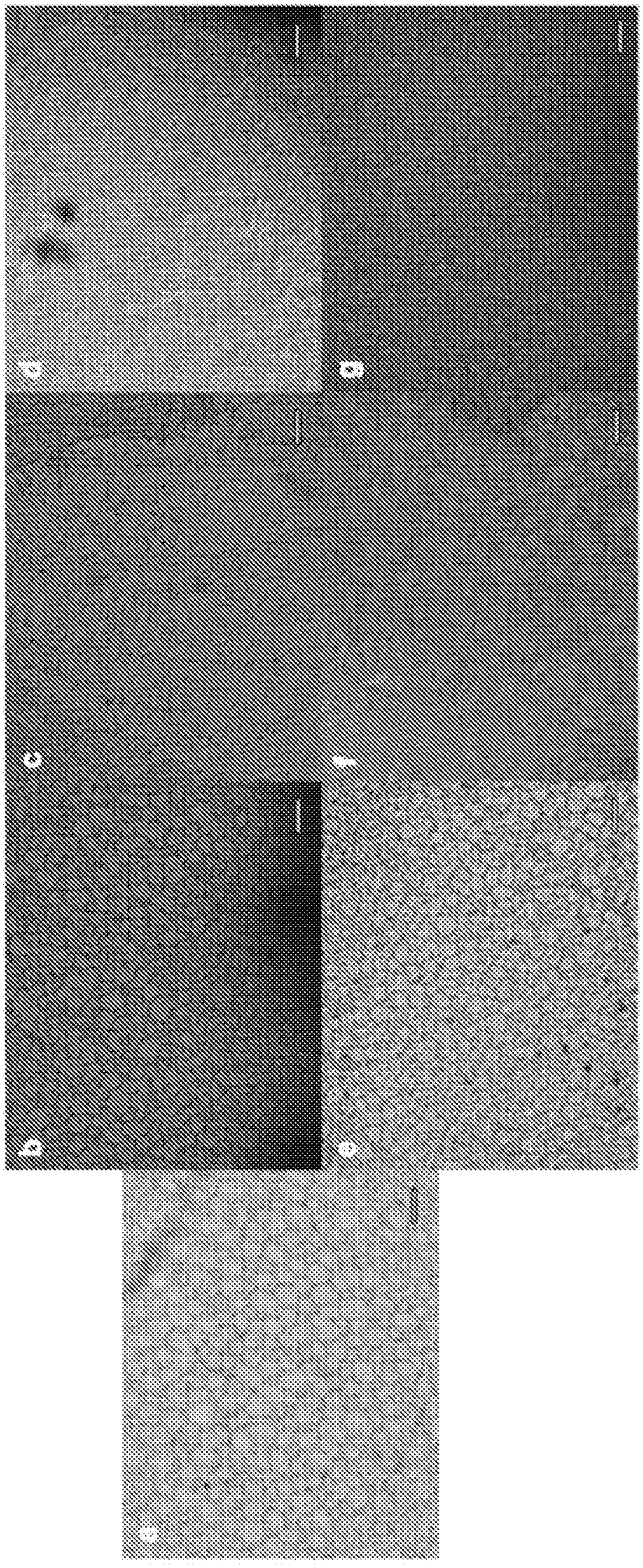
FIG. 2 illustrates optical micrographs of IRI splat assay in accordance with examples of the disclosure.

FIG. 2 illustrates optical micrographs of IRI splat assay of PEG, PVA, and PEG-PVA in pH 13 adjusted PBS solution. Images show individual ice crystal grains that form in (a) pH 13 control solution, (b) 0.25 mg/mL PEG (PEG-L), (c) 0.25 mg/mL PVA (PVA-L), (d) 0.25 mg/mL PEG-PVA (PEG-PVA-L), (e) 0.50 mg/mL PEG (PEG-H), (f) 0.50 mg/mL PVA (PVA-H), and (g) 0.50 mg/mL PEG-PVA (PEG-PVA-H) in pH 13 after 30 minutes of annealing at −4° C. Scale bars=100 μm. In the illustrated examples, the IRI activities of both PVA and PEG-PVA were unaffected by the pH 13 solution. Further, the composition including PEG-PVA additive shows an 88% reduction in the size of ice crystals compared to neat pH 13 solution.

Figure 3:
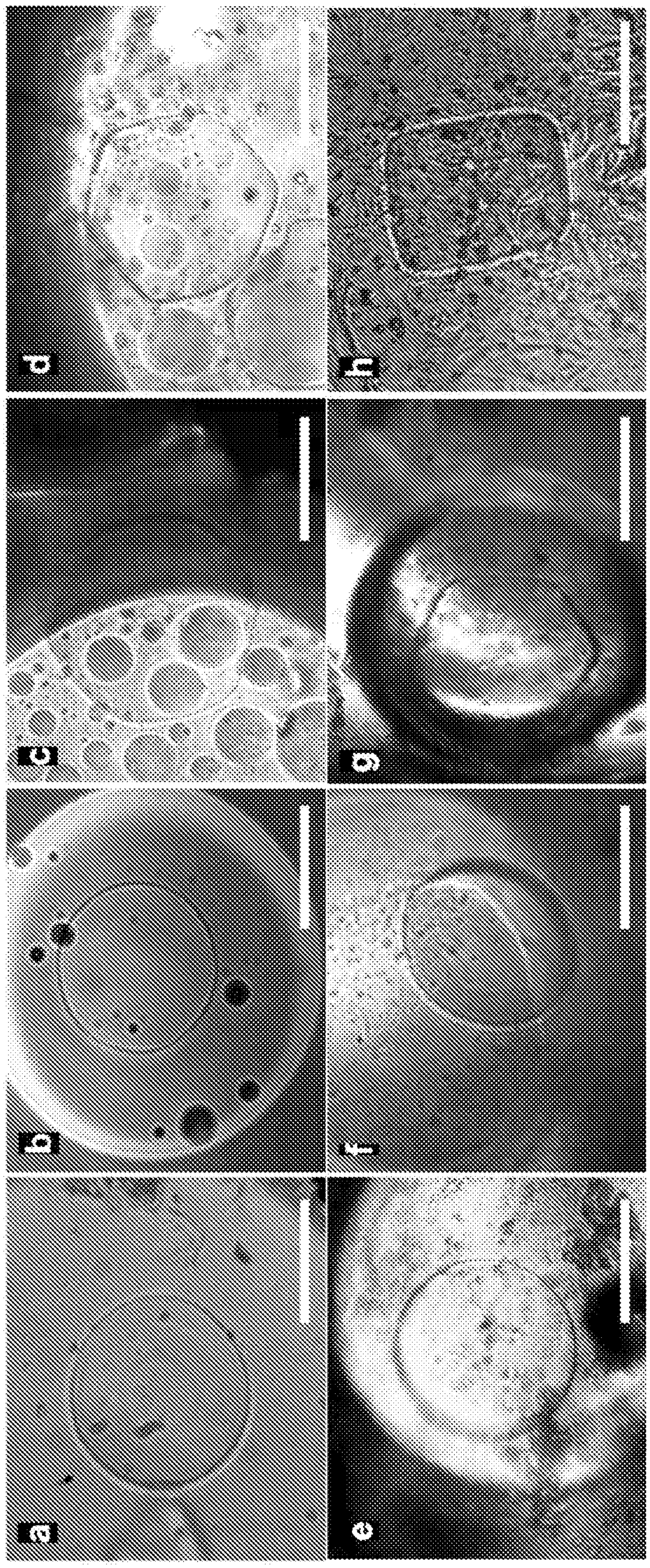
FIG. 3 illustrates optical micrographs of dynamic ice shaping (DIS) for exemplary polymer additive assays in accordance with examples of the disclosure.

FIG. 3 illustrates optical micrographs of DIS for exemplary polymer additives. Single ice crystals for (a) DI water, (b) 10 mg/mL PEG in DI, (c) 10 mg/mL PVA in DI, and (d) PEG-PVA at 10 mg/mL in DI. In the illustrative examples, both PVA and PEG-PVA display hexagonal ice shaping. (e) sat. $Ca(OH)_2$ solution, (f) 10 mg/mL PEG in sat. $Ca(OH)_2$ solution, (g) 10 mg/mL PVA in sat. $Ca(OH)_2$ solution, and (h) 10 mg/mL PEG-PVA in sat. $Ca(OH)_2$ solution. Both PVA and PEG-PVA maintain their ability to shape ice in the presence of saturated $Ca(OH)_2$ solution. Note that in (c), (d), and (g), the c-axis of hexagonal ice crystal is aligned with the plane of image and in (h), it is perpendicular to the plane of image. Scale bars=50 μm.

The information illustrated in FIG. 3 demonstrates that both PVA and PEG-PVA induced hexagonal shaping, indicating evidence of interaction of these molecules with ice crystal surfaces. It is thought that the IRI activity of PVA is a result of hydroxyl group interaction with the prismatic faces of Ih (hexagonal) ice. Together, the IRI and DIS results indicated good potential for PVA and PEG-PVA to enhance freeze-thaw resistance of cement paste and concrete via a new mechanism related to inhibition of ice crystal growth.

Figure 4:
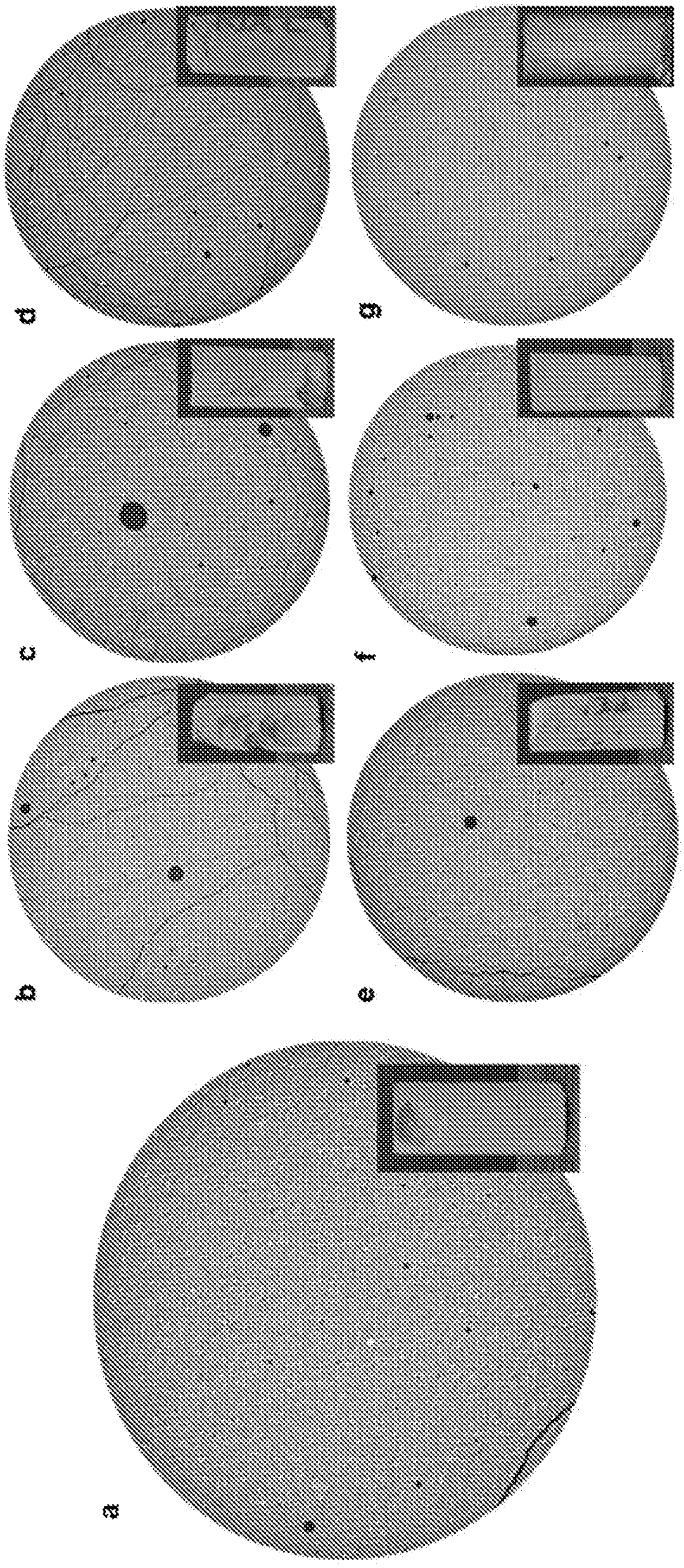
FIG. 4 illustrates post freeze-thaw micro X-ray computed tomography (MXCT) 2D cross-sectional images of cement pastes in accordance with examples of the disclosure.

FIG. 4 illustrates post freeze-thaw micro X-ray computed tomography (MXCT) 2D cross-sectional images of (a) control, (b) PEG-L, (c) PVA-L, (d) PEG-PVA-L, (e) PEG-H, (f) PVA-H, and (g) PEG-PVA-H cement paste formulations. Inset images show bulk samples post freeze-thaw. MXCT cross sections are 9 mm in diameter. Bulk samples are 16 mm in diameter by 32 mm in height.

The MXCT images of paste samples are captured after exposure to 30 freeze-thaw cycles. Control paste and pastes containing both low (L) (0.01 wt. % cement) and high (H) (0.021 wt. % cement) additions of PEG and PVA exhibited signs of internal crack formation. Additionally, external spalling was observed in all of these samples, as can be seen in the inset images. OPC paste containing PEG-PVA at an addition of 0.021 wt. % of cement (PEG-PVA-H) exhibited no damage. All other samples exhibited signs of freeze-thaw damage, including crack formation within the scanned volumes and spalling of the surface (inset images of FIG. 4).

Even though PVA was IRI active, it did not fully mitigate freeze-thaw damage in cement paste. Its relative inability to mitigate freeze-thaw damage in paste is possibly attributable to (1) insufficient molecular weight and (2) its propensity to form hydrogels, specifically when exposed to freeze-thaw cycling (i.e., cryogenic gelation). Cryogenic gelation of PVA occurs due to the formation of crystalline structures upon repeated freeze-thaw cycles that subsequently behave as physical crosslinkers. The internal formation and swelling of a hydrogel or cryogel within cement paste could induce cracking, as observed herein. Due to the addition of PEG, the ability of PEG-PVA to form a hydrogel or cryogel may have been reduced compared to PVA, given that PEG behaves as a plasticizing agent to inhibit crystallization.

Figure 5:
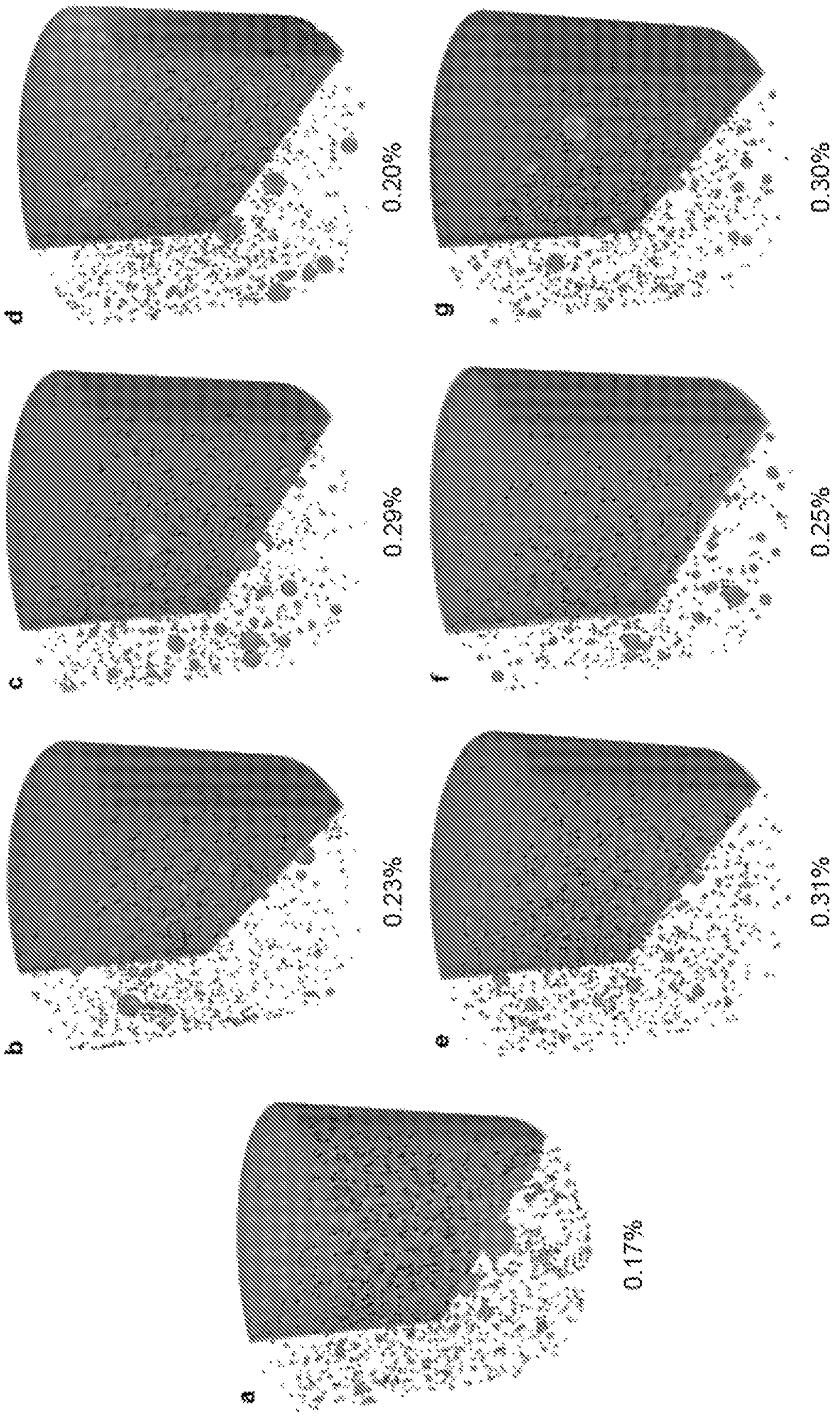
FIG. 5 illustrates MXCT 3D reconstructions of air void systems and calculated air content for cement paste formulations in accordance with examples of the disclosure.

FIG. 5 illustrates MXCT 3D reconstructions of air void systems and calculated air content for cement paste formulations. Representative 3D reconstructions with air voids for (a) control, (b) PEG-L, (c) PVA-L, (d) PEG-PVA-L, (e) PEG-H, (f) PVA-H, and (g) PEG-PVA-H. Each cylindrical scanned volume is 9 mm in diameter and 8 mm in height. The average (n=2) percent volume of air, or air content, is shown under each reconstruction.

The percent volume of air, or air content, of paste samples was determined using MXCT by measuring the initial volume of pores with a diameter >50 μm. PEG, PVA, and PEG-PVA at both low (L) and high (H) concentrations introduce <0.8% air content in the paste. These observed air contents are lower than the industry accepted air contents of ~16 to 25% air by volume of cement paste that are recommended for freeze-thaw resistance. In addition to substantiating a negligible effect on initial compressive strength, we also confirmed no significant effect on the heat of hydration or time of set, flowability, and mineralogy of OPC paste with polymer additions.

Figure 6:
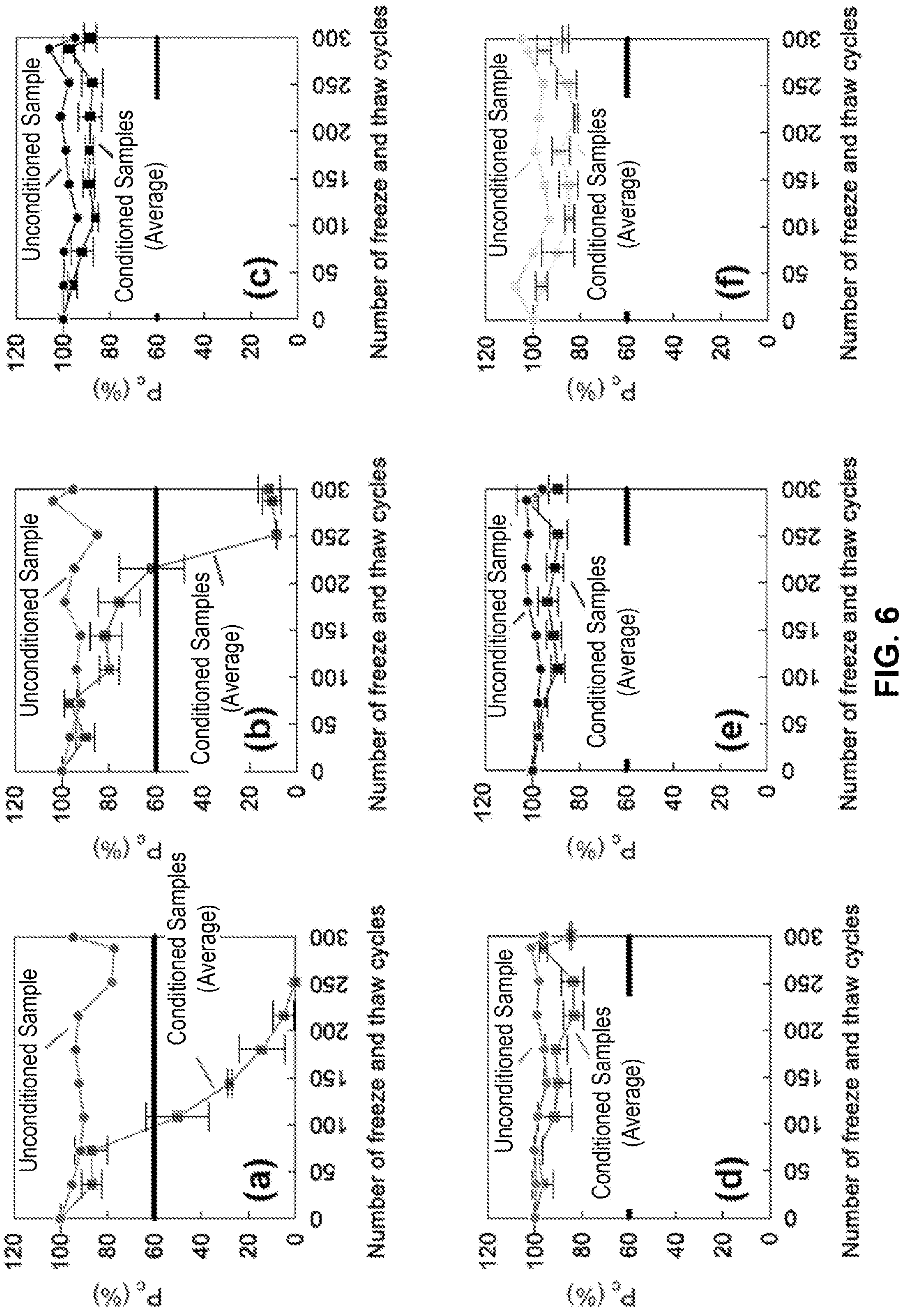
FIG. 6 illustrates average relative dynamic modulus of elasticity ($P_c$) for concrete in accordance with examples of the disclosure.

FIG. 6 illustrates average relative dynamic modulus of elasticity ($P_c$) for each concrete test group. (a) control, (b) 0.022% PEG-PVA, (c) 0.066% PEG-PVA, (d) 0.25% PEG-PVA, (e) 1.0% PEG-PVA, and (f) AEA. Three samples within each test group were subjected to freeze-thaw cycling. One sample in each test group was left at ambient conditions. The horizontal lines at 60% $P_c$ represent failure criteria. While it was determined that a minimum concentration of 0.021% PEG-PVA (by weight percent of cement) was sufficient to inhibit freeze-thaw damage in paste, we evaluated the effect of increasing PEG-PVA concentration on the freeze-thaw resistance of concrete. PEG-PVA-modified samples were concurrently tested with unmodified (i.e., Control) formulations and AEA-modified concrete. In accordance with industry standards, the relative dynamic moduli of elasticity, durability factor, and length change were monitored during freeze-thaw cycling. The change in relative dynamic modulus of elasticity, $P_c$, a quantitative measure of mechanical integrity, during 300 freeze-thaw cycles is shown. As evidenced by data in FIG. 6, the $P_c$ of the Control and 0.022% PEG-PVA samples dropped below 60% after 250 cycles of testing. However, the $P_c$, of all samples with PEG-PVA≥0.066% and the AEA sample, as expected, remained above 60%, indicating acceptable resistance to freeze-thaw cycling.

Figure 7:
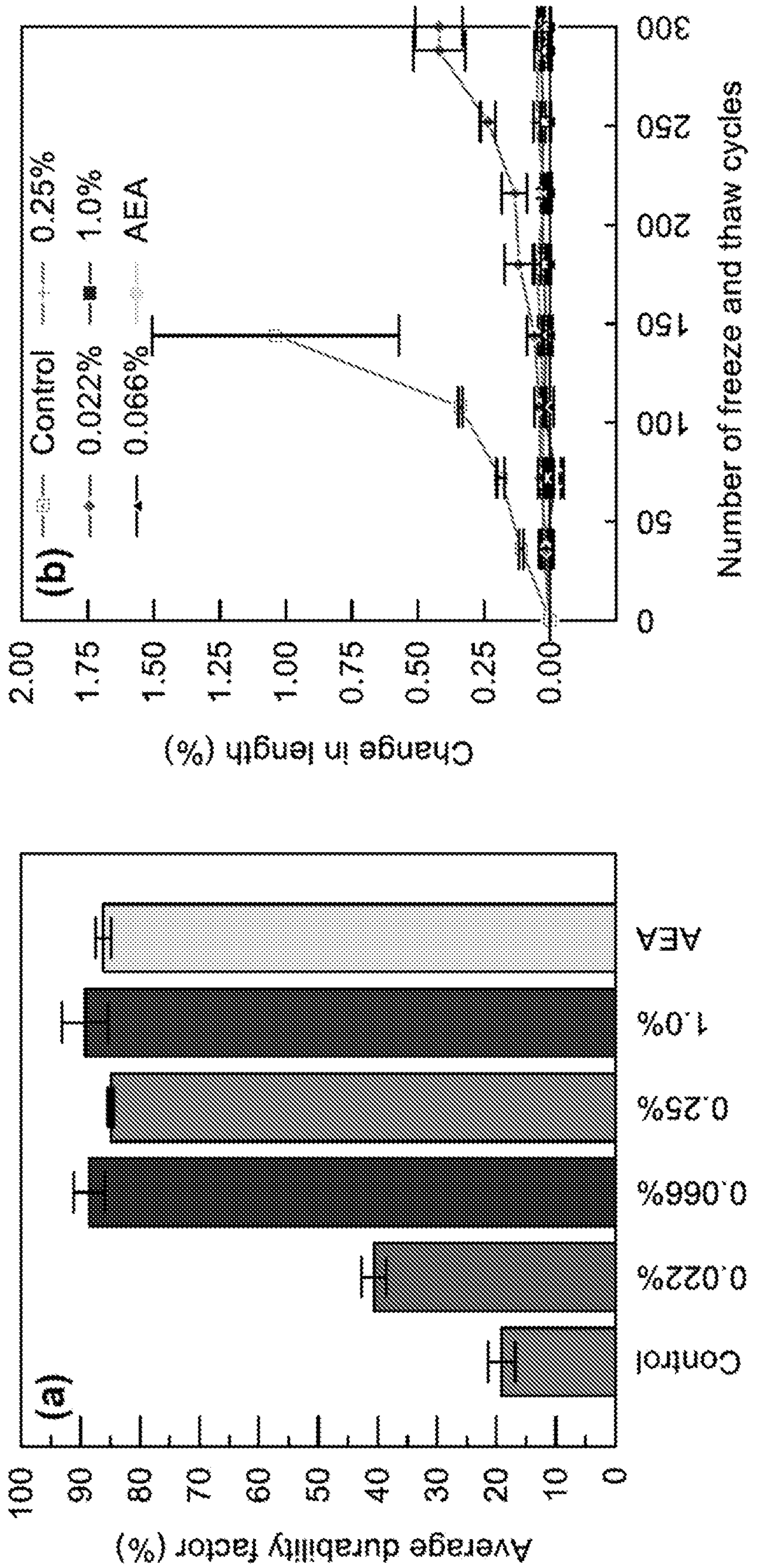
FIG. 7 illustrates (a) average durability factor and (b) average length change for concrete in accordance with examples of the disclosure.

FIG. 7 illustrates (a) average durability factor and (b) average length change for each concrete test group. Error bars represent the standard deviation of n=3 replicates.

Previous research has shown that an increase in length with increasing number of freeze-thaw cycles coincides with deterioration. Samples containing PEG-PVA at additions of 0.066% to 1.00% and AEA saw length changes <0.1%—the maximum threshold for freeze-thaw resistance. Both the Control and 0.022% PEG-PVA samples exhibited length changes >0.1%, indicating unacceptable dimensional instability according to the standard.

According to data in FIG. 6 and FIG. 7, samples containing 0.066%, 0.25%, and 1.00% PEG-PVA and the AEA sample all exhibited acceptable freeze-thaw performance, while the Control formulation and the 0.022% PEG-PVA sample failed according to the standard.

The key question remained whether the PEG-PVA-containing samples that resisted freeze-thaw damage did so via air entrainment or a mechanism related to inhibiting ice crystal growth. To determine whether the PEG-PVA-modified concretes that met the specification did so by a mechanism other than entraining sufficient air, the fresh- and hardened-state air contents and void spacing factors for all samples were measured (Table 3). To resist freeze-thaw damage via an AEA mechanism, a minimum fresh-state air content of 6.5% is recommended for air-entrained concrete with a nominal maximum aggregate size of <25 mm, which was used, and a maximum void spacing factor <250 μm is recommended. In general, a hardened-state air content of ~4-10% ensures adequate resistance to freeze-thaw damage.

TABLE 3

Fresh- and hardened-state air content of concrete.

| Test Group | Fresh-State Air Content (%) | Hardened-State Air Content (%) | Spacing Factor (μm) |
|---|---|---|---|
| Control | 2.1 | 2.7 | 1061 |
| 0.022% PEG-PVA | 3.0 | 1.5 | 400 |
| 0.066% PEG-PVA | 4.2 | 2.3 | 392 |
| 0.25% PEG-PVA | 13 | 5.2 | 308 |
| 1.0% PEG-PVA | 30 | 19.6 | 191 |
| AEA | 7.0 | 4.0 | 218 |

TABLE 4

Fresh-state properties of each test group. Slump- and fresh-state air content were measured from batches used to make samples for freeze-thaw cycling.

| Test Group | Slump (in.) |
|---|---|
| Control | 0.375 |
| 0.022% | 1.4 |
| 0.066% | 1.625 |
| 0.25% | 2.5 |
| 1% | 6.5 |
| AEA (Air Entrained) | 0.625 |

The AEA sample contained 7.0% and 4.0% air in the fresh- and hardened-state, respectively, and exhibited a spacing factor of 218 μm, thereby meeting the industry recommendation, as anticipated. In contrast, the 0.066% PEG-PVA sample exhibited fresh- and hardened-state air contents of 4.2% and 3.2%, respectively, as well as a 392 μm spacing factor (>250 μm), substantiating that the 0.066% PEG-PVA sample prevented freeze-thaw damage in concrete samples without a properly entrained air void system.

Together with the IRI and DIS data, the freeze-thaw resistance testing and air void content analysis reveals that, in sufficient dosages, PEG-PVA can resist freeze-thaw damage in OPC paste and concrete by a mechanism that is distinct from AEAs. While AEAs stabilize an air void system that helps dissipate hydraulic and osmotic pressures that are generated by ice crystal growth and coalescence, the results presented herein substantiate that PEG-PVA-modified concrete impart freeze-thaw resistance to concrete via IRI and DIS activity. Given that PEG-PVA exhibited IRI and DIS activity in high-pH solutions characteristic of OPC pore solution, the resistance of PEG-PVA-modified concrete to resist freeze-thaw damage is mechanistically attributable to the ability of PEG-PVA to inhibit ice crystal growth.

These results suggest that biomimetic antifreeze molecules, like PEG-PVA, can inhibit freeze-thaw damage in cement paste and concrete. Use of these and similar molecules may help counter other deleterious disadvantages that coincide with the use of AEAs. For example, despite achieving target air void contents, some AEAs do not necessarily mitigate freeze-thaw damage—a result that suggests the chemical properties of AEAs may play a critical role in their effectiveness. In addition, it is well known that reductions in compressive strength, increased permeability, and retardation of setting time can occur with the use of AEAs—behaviors that were not exhibited herein by the use of PEG-PVA in cement paste. Furthermore, recent research has indicated that, if a critical water saturation level is reached in air-entrained concrete (~86-88%), entrained air void systems are rendered ineffective and freeze-thaw damage is inevitable. While the time to reach this critical water saturation level can be years, the propensity for unavoidable damage in saturated air-entrained concrete is a limitation to the use of AEAs.

In summary, the above results indicate that robust IRI- and DIS-active molecules with an ability to interact directly with ice and prevent its continued growth and coalescence can provide an alternative mechanistic approach to freeze-thaw mitigation in cement paste and concrete.

The present invention has been described above with reference to a number of exemplary embodiments and examples. It should be appreciated that the particular embodiments shown and described herein are illustrative of the preferred embodiments of the invention and its best mode, and are not intended to limit the scope of the invention. Further examples of the disclosure are set forth in the claims. It will be recognized that changes and modifications may be made to the embodiments described herein without departing from the scope of the present invention. These and other changes or modifications are intended to be included within the scope of the present invention.

We claim:

1. A cement paste composition comprising:

cement;

water; and a water-soluble additive comprising a first polymer or a copolymer comprising a first polymer segment and a second polymer or a second polymer segment, wherein the first polymer and the second polymer or the first polymer segment and the second polymer segment are different, the first polymer or the first polymer segment comprising polyvinyl alcohol (PVA), wherein a weight ratio of the water-soluble additive to the cement is between 0.03% and 0.07%, and wherein the water-soluble additive in the cement composition is dissolved and is configured to perform one or more of ice recrystallization inhibition and dynamic ice shaping when the cement composition is exposed to temperatures less than or equal to a freezing temperature of water.

2. The cement paste composition of claim 1, wherein the water-soluble additive comprises a copolymer of PVA and PEG.

3. The cement paste composition of claim 1, wherein the first polymer or the first copolymer segment is configured to perform the one or more of ice recrystallization inhibition and dynamic ice shaping.

4. The cement paste composition of claim 1, wherein a molecular weight of the water-soluble additive is between about 500 and about 500,000, about 10,000 and about 150,000, or about 40,000 and about 50,000 Daltons.

5. The cement paste composition of claim 1, wherein the water-soluble additive can be represented by the general formula $(C_2H_3O)_n(C_2H_4O)_m$, where nom ranges from about 6:19 to about 561:1685, or about 229:687 to about 286:858.

6. The cement paste composition of claim 1, wherein the water-soluble additive inhibits freeze-thaw damage in a cement paste comprising the cement composition.

7. The cement paste composition of claim 1, wherein the water-soluble additive inhibits ice crystal growth in a cement paste comprising the cement composition.

8. The cement paste composition of claim 1, wherein the water-soluble additive further comprises one or more of poly(2-hydroxyethyl methacrylate) (pHEMA), poly(2-hydroxypropyl methacrylamide) (pHPMA), polyethylene glycol (PEG), and zirconium acetate.

9. The cement paste composition of claim 1, wherein the copolymer comprises PVA and PEG represented by the Formula 1, wherein n ranges from greater than 0 to 561, m ranges from 19 to 1695, and p ranges from 19 to 1695, Formula 1

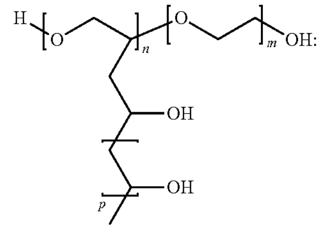

10. The cement paste composition of claim 1, wherein a molecular weight of the water-soluble additive is between about 40,000 and about 50,000 Daltons.

11. The cement paste composition of claim 1, wherein the water-soluble additive comprises one or more of safranin-O, folic acid, gelatin, and alkylated galactose derivatives.

12. The cement paste composition of claim 1, the second polymer or the second polymer segment comprising polyethylene glycol (PEG).

13. The cement paste composition of claim 12, wherein the second polymer or the second copolymer segment is more stable in the cement paste at a pH greater than or equal to 7, or about 7 to about 14 or about 12 to about 13.5.

14. A cement paste composition comprising:
cement;
water; and
a water-soluble additive comprising a first polymer or a copolymer comprising a first polymer segment and a second polymer or a second polymer segment, the first polymer or the first polymer segment comprising polyvinyl alcohol (PVA), the second polymer or the second polymer segment comprising polyethylene glycol (PEG),
wherein a weight ratio of the water-soluble additive to the cement is between 0.03% and 0.07%, and
wherein the water-soluble additive in the cement composition is dissolved and is configured to perform one or more of ice recrystallization inhibition and dynamic ice shaping when the cement composition is exposed to temperatures less than or equal to a freezing temperature of water.

15. A cement paste composition comprising:
cement;
water; and
a water-soluble additive comprising a first polymer or a copolymer comprising a first polymer segment, the first polymer or the first polymer segment comprising polyvinyl alcohol (PVA), wherein the water-soluble additive comprises a copolymer of PVA and PEG,
wherein a weight ratio of the water-soluble additive to the cement is between 0.03% and 0.07%, and
wherein the water-soluble additive in the cement composition is dissolved and is configured to perform one or more of ice recrystallization inhibition and dynamic ice shaping when the cement composition is exposed to temperatures less than or equal to a freezing temperature of water.

16. A cement paste composition comprising:
cement;
water; and
a water-soluble additive comprising a first polymer or a copolymer comprising a first polymer segment, the first polymer or the first polymer segment comprising polyvinyl alcohol (PVA), wherein the water-soluble additive can be represented by the general formula $(C_2H_3O)_n(C_2H_4O)_m$, where nom ranges from about 6:19 to about 561:1685, or about 229:687 to about 286:858,
wherein a weight ratio of the water-soluble additive to the cement is between 0.03% and 0.07%, and
wherein the water-soluble additive in the cement composition is dissolved and is configured to perform one or more of ice recrystallization inhibition and dynamic ice shaping when the cement composition is exposed to temperatures less than or equal to a freezing temperature of water.

17. A cement paste composition comprising:
cement;
water; and
a water-soluble additive comprising a first polymer or a copolymer comprising a first polymer segment, the first polymer or the first polymer segment comprising polyvinyl alcohol (PVA), wherein the water-soluble additive further comprises one or more of poly(2-hydroxyethyl methacrylate) (pHEMA), poly(2-hydroxypropyl methacrylamide) (pHPMA), polyethylene glycol (PEG), and zirconium acetate,
wherein a weight ratio of the water-soluble additive to the cement is between 0.03% and 0.07%, and
wherein the water-soluble additive in the cement composition is dissolved and is configured to perform one or more of ice recrystallization inhibition and dynamic ice shaping when the cement composition is exposed to temperatures less than or equal to a freezing temperature of water.

18. A cement paste composition comprising:

cement;

water; and a water-soluble additive comprising a first polymer or a copolymer comprising a first polymer segment, the first polymer or the first polymer segment comprising polyvinyl alcohol (PVA), wherein the water-soluble additive comprises one or more of safranin-O, folic acid, gelatin, and alkylated galactose derivatives, wherein a weight ratio of the water-soluble additive to the cement is between 0.03% and 0.07%, and wherein the water-soluble additive in the cement composition is dissolved and is configured to perform one or more of ice recrystallization inhibition and dynamic ice shaping when the cement composition is exposed to temperatures less than or equal to a freezing temperature of water.

* * * * *